United States Patent

Hallman

[11] 4,183,390
[45] Jan. 15, 1980

[54] PUNCTURE-SEALING TIRE
[75] Inventor: Robert W. Hallman, Medina, Ohio
[73] Assignee: The B.F. Goodrich Company, New York, N.Y.
[21] Appl. No.: 791,761
[22] Filed: Apr. 28, 1977
[51] Int. Cl.² ............................................. B60C 5/00
[52] U.S. Cl. .................................. 152/347; 156/115; 428/912
[58] Field of Search ........................... 156/110 R, 115; 152/330 RF, 346–348; 428/912

[56] References Cited

U.S. PATENT DOCUMENTS

| | | | |
|---|---|---|---|
| 1,217,888 | 2/1917 | Tinsman et al. | 152/346 |
| 1,237,698 | 8/1917 | Reuter | 152/346 |
| 1,427,278 | 8/1922 | Fetter | 152/346 |
| 1,683,454 | 9/1928 | Fetter | 152/346 |
| 2,349,549 | 5/1944 | Hardman et al. | 264/311 |
| 2,657,729 | 11/1953 | Hardman et al. | 156/115 |
| 2,818,902 | 1/1958 | Schutz | 152/347 |
| 3,935,893 | 2/1976 | Stang et al. | 152/347 |
| 3,952,787 | 4/1976 | Okado et al. | 152/347 |
| 3,981,342 | 9/1976 | Faber et al. | 428/912 |
| 3,987,833 | 10/1976 | Powell et al. | 152/347 |

OTHER PUBLICATIONS

"Rubber Technology and Manufacture" by Blow, CRC Press, Cleveland, Ohio, pp. 148, 149, 209, 210.

Primary Examiner—John E. Kittle
Attorney, Agent, or Firm—Joe A. Powell

[57] ABSTRACT

A puncture-sealing pneumatic tire has a soft, vulcanized inner layer consisting of cis-polyisoprene rubber and/or natural rubber. The inner layer is preferably coated with a polyolefin polymer that flows into punctures at operating temperatures and said polyolefin polymer adheres to the inner layer by means of surface tension alone.

26 Claims, 4 Drawing Figures

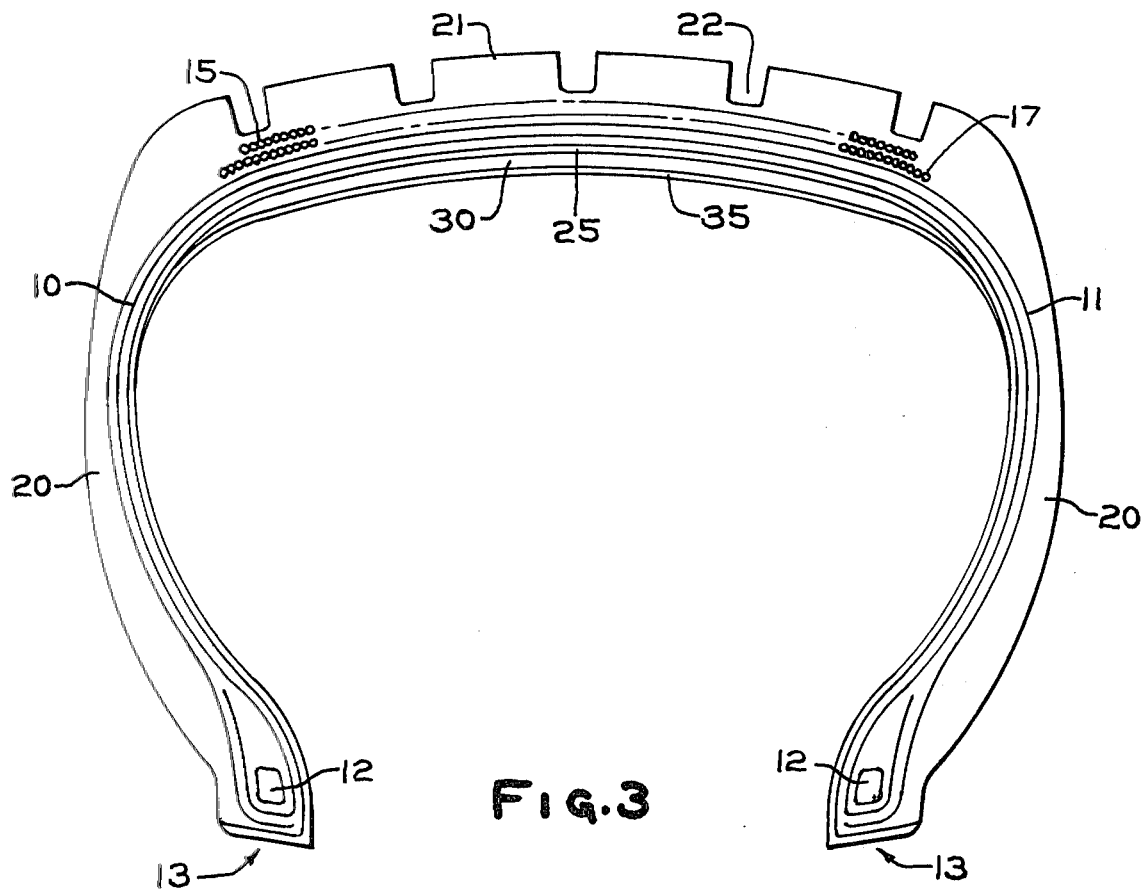
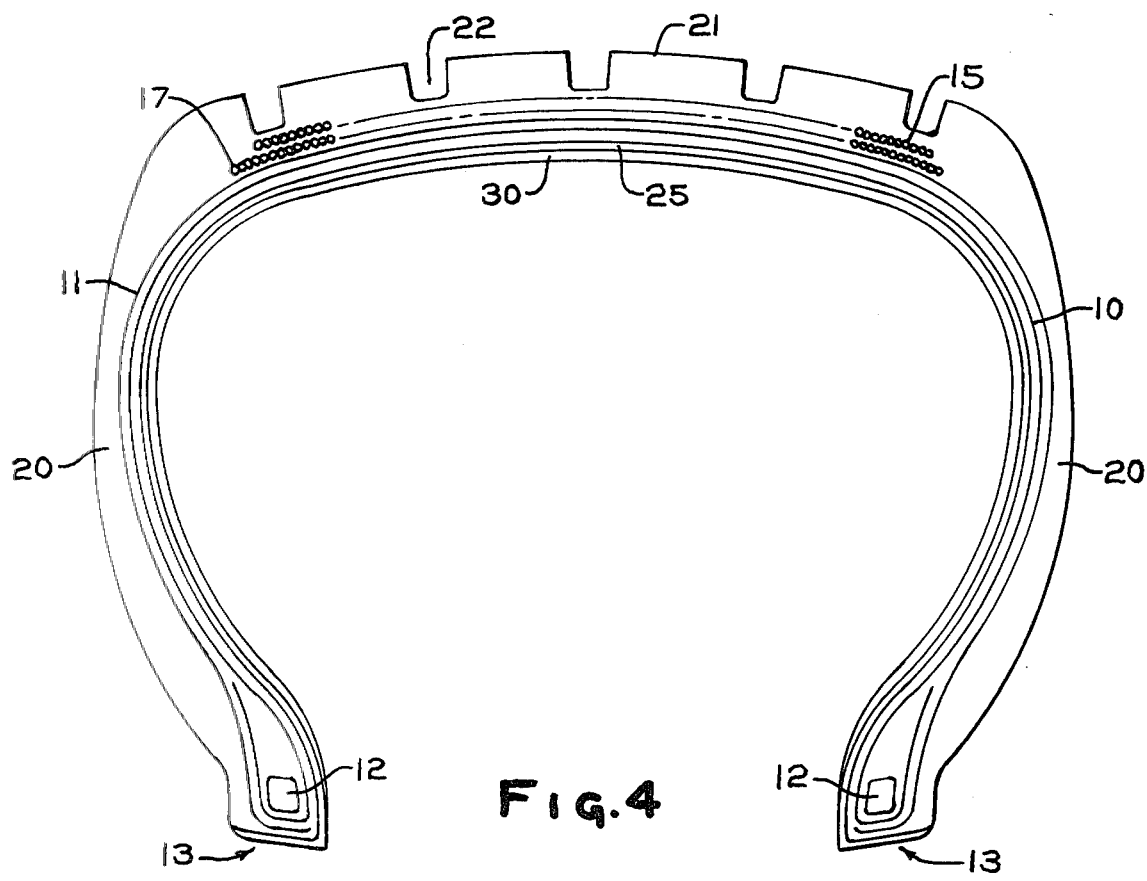

PUNCTURE-SEALING TIRE

BACKGROUND OF THE INVENTION

A pneumatic tire has historically been sought which has a reliable means of retarding or stopping its deflation upon being punctured. Such a tire would reduce the frequency of tire changes on our high-speed interstate highways, thereby resulting in increased safety for the motoring public. Because attention to vehicle safety is on the increase, many vehicle and tire manufacturers have become interested in equipping vehicles with pneumatic tires having the capability of either sealing or reducing the rate of inflation loss after puncture. Some vehicle and tire manufacturers have become interested in equipping vehicles with such a tire in conjunction with a low-pressure warning device that would inform the motorist when the tire-inflation pressure drops below a prescribed amount and then the "slow-leak" feature of such a tire would allow the motorist to take corrective action.

Various approaches to achieve a sealant or "slow-leak" pneumatic tire have been proposed without lasting commercial success. One approach that has been proposed is to attach a layer of elastomer sealant containing no curatives to the inside of the unvulcanized tire. The tire is then vulcanized resulting in an unvulcanized sticky layer of elastomer on the inside of the vulcanized tire which acts as a sealant. This approach has not had significant commercial success because of manufacturing, technical, and economic problems associated with producing such a tire. The unvulcanized layer of elastomer sealant has a tendency to stick to the curing bladder thus causing high amounts of unacceptable tires. Even when an acceptable tire is produced by this method, during normal service of the tire other problems occur. Since the elastomer sealant is unvulcanized, it behaves like a plastic and will flow to the center of the tire as a result of the heat and centrifugal force generated by high-speed driving.

Another approach proposed to achieve a sealant or "slow-leak" tire is to apply a soft sticky sealant layer to the inside of a vulcanized tire. Although this approach solves the manufacturing problems discussed above, it creates a new set of problems. The inside of the tire must be thoroughly cleaned to remove the residual mold-release agent, usually by buffing, in order to obtain adhesion between the inside of the tire and the sealant. U.S. Pat. No. 3,935,893 describes a sealant added to a vulcanized tire and a cleaning technique used to obtain adhesion between the tire and sealant. Although effective, the cleaning process used for these types of sealants is time consuming and expensive. It is desirable to have a tire sealant which can be built onto an unvulcanized tire and vulcanized therewith.

SUMMARY OF THE INVENTION

A puncture-sealing tubeless pneumatic tire has a soft (25–40 Shore A durometer), vulcanized inner layer consisting of cis-polyisoprene rubber and/or natural rubber. The inner layer has a thickness in the range of about 1 to about 50 percent of the total tire thickness, and may extend completely across the inside of the tire from one bead to the other bead, but is preferably only under the tread area of the tire (where punctures are most likely to occur). The sealant layer is normally attached to the air-impervious liner such that the sealant is in contact with the inflation gas but can be positioned between the innermost carcass-reinforcement ply and the air-impervious liner. The sealant layer (or the air-impervious liner if it is next to the inflation gas) may be coated with a polyolefin polymer capable of flowing into punctures at operating temperature and said polyolefin polymer is capable of adhering to the sealant layer by means of surface tension alone.

BRIEF DESCRIPTION OF THE DRAWINGS

FIG. 3 is a cross-sectional view of a typical tubeless passenger-car tire incorporating another embodiment of the invention wherein the tire of FIG. 1 has a thin coating of a polyolefin polymer applied to the sealant layer.

FIG. 4 is a cross-sectional view of a typical tubeless passenger-car tire wherein the sealant of this invention extends from bead-to-bead.

DETAILED DESCRIPTION

Figure 1:
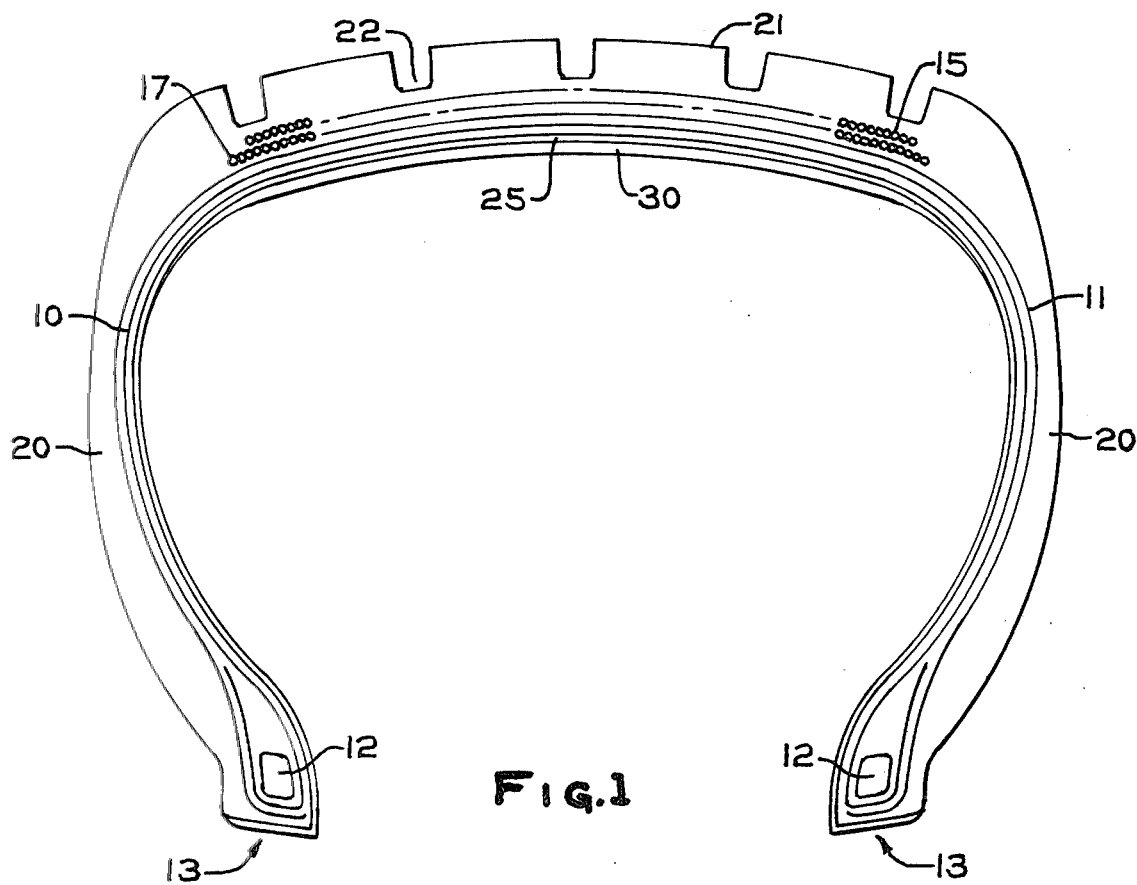
FIG. 1 is a cross-sectional view of a typical tubeless passenger-car tire incorporating the presently preferred embodiment of the invention wherein the tire has an integral sealant layer as its innermost portion.

This invention can be used in any kind or size of tubeless pneumatic tire, but since a constantly increasing proportion of tires is being made with radial-cord carcasses, the invention is illustrated in connection with a radial cord, tubeless, passenger-car tire.

Pneumatic tires generally consist of a flexible-cord carcass or body to resist the pressure of the inflation gas, terminated at each side edge by a bead which engages the rim of a wheel. The cords are embedded in rubber, and are protected from abrasion by tread and sidewall rubber, and are made to hold air by preferably having an integral essentially impervious liner on the interior of the carcass.

In the drawing (FIG. 1), two plies of carcass cords 10 and 11, which may be high-tenacity rayon, polyester, or other suitable material, lie with the individual rubberized cords essentially in radial planes. The edges of the plies are suitably wrapped around inextensible bead grommets 12 forming part of molded beads 13 shaped for engagement with a standard rim.

The radial cord plies 10 and 11 in the crown of the tire, which is the region capable of engaging the road, are surrounded by a circumferential belt, which in this instance is shown as consisting of two strips of steel cords but could be of other low-extensible material such as aromatic polyamide fibers also known as aramid fibers. The steel cord belt plies 15 and 17 are preferably prepared with the cords in each ply parallel to each other and at an angle to the circumferential central plane of the tire, the cords in one ply extending in a direction opposite to the cords in the other ply. This angle in the finished tire may be about 15° to 30° relative to the circumferential central plane. The two crown plies form an essentially inextensible belt around the radial cord plies.

A protective layer of rubber completely surrounds the tire. This is preferably composed of a moderate thickness of sidewall rubber 20 in the zones where intense flexing occurs, and a thick layer of tread rubber 21 for resisting road wear. The tread layer has a suitable nonskid pattern 22 of slits, slots, grooves and the like.

On the inner face of the tire is a liner 25 composed of a rubber material having resistance to diffusion of air such as butyl rubber, or halogenated butyl rubber, and/or blends thereof, and extending from one bead 13 to the other bead so as to seal against the rim and minimize the loss of inflation gas or its penetration into the body of the tire.

In accordance with this invention, the improved tire has, in addition to the features just described which were known before this invention, a sealant layer 30 of soft, vulcanized polyolefin rubber such as cis-polyisoprene and/or natural rubber. The sealant layer 30 can contain either natural rubber or cis-polyisoprene rubber or a mixture of the two rubbers. Cis-polyisoprene, which is a synthetic rubber normally recognized as the synthetic equivalent of natural rubber, and/or natural rubber are particularly desirable rubbers to use in the sealant layer because of their high resiliency and their good processing characteristics at low loadings. These rubbers also have a tendency to revert slightly when vulcanized at high temperatures and unprotected by antioxidants. Reversion is a phenomenon which occurs, particularly with sulfur cures in natural rubber, when the vulcanizate is heated longer than is required for optimum cure. Reversion is noted by a deterioration of physical properties, especially modulus. This feature of slight reversion is desirable in this invention. The sealant layer 30 can extend from one bead 13 to the other bead, as is shown in FIG. 4, but preferably extends only across the entire crown portion of the tire, that is, under the entire tread where punctures are most likely to occur.

The sealant layer 30 is soft and resilient, that is, it has a Shore A durometer of from about 25 to about 40 (as measured according to the method of ASTM D 2240) when in the vulcanized state. In addition to the cis-polyisoprene and/or natural rubber, the sealant layer can contain compounding ingredients such as filler, activators, curing agents, plasticizers and the like. Because the durometer must not be greater than about 40, large amounts of compounding ingredients which tend to make the sealant harder, such as carbon black, should be avoided. Preferably, the sealant contains only cis-polyisoprene and/or natural rubber together with activators and curing agents sufficient to vulcanize the rubber. In the rubber compounding art, this type of formulation is referred to as a pure-gum recipe. A typical recipe normally would include only rubber, activators such as zinc oxide, stearic acid and the like, sulfur and accelerators. Antioxidants normally are not used so as to allow the rubber to partially revert during the tire vulcanization process. Sulfur donor cure systems also are not normally used because they retard reversion.

The thickness of the sealant layer 30 is from about 1 to about 50 percent of the total tire thickness, as measured in the center of the tread area. Preferably, the thickness is from about 10 to about 30 percent of the total tire thickness. A typical thickness for a radial passenger tire is from about 0.1 inch to about 0.2 inch.

Figure 2:
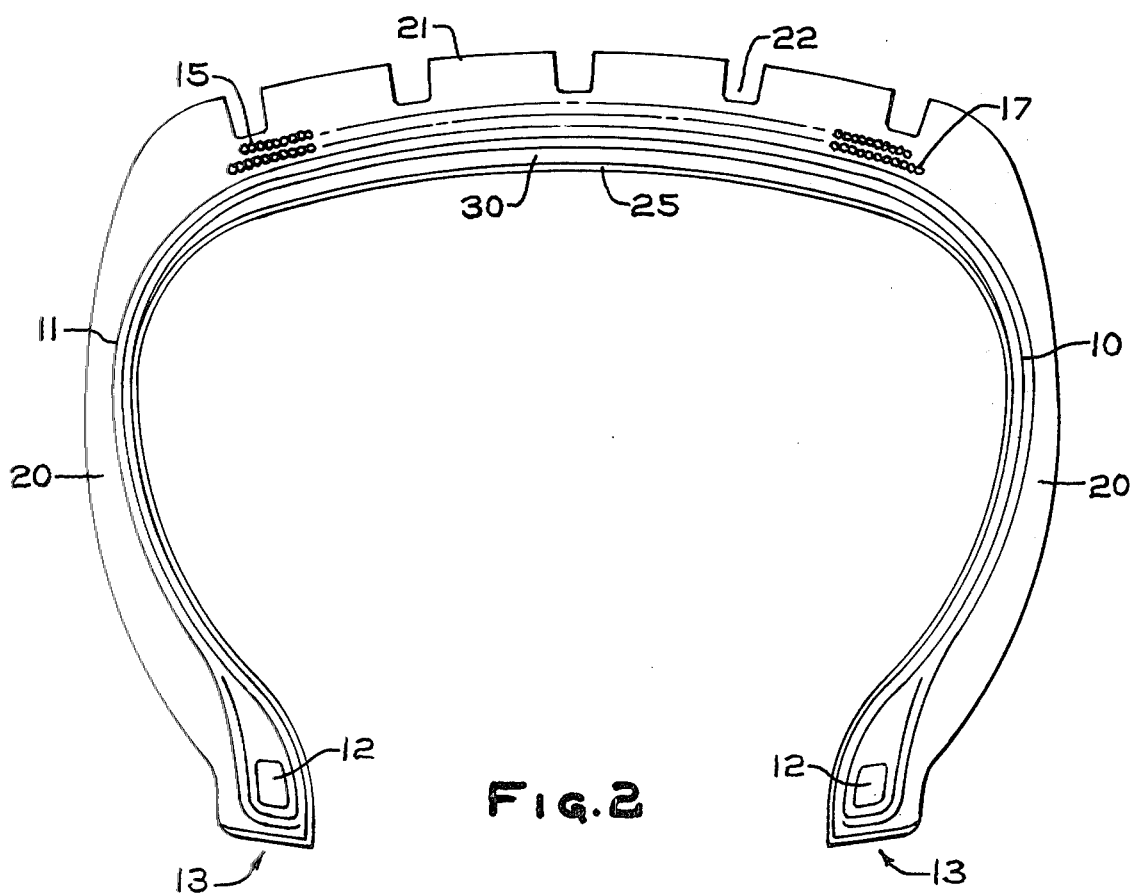
FIG. 2 is a cross-sectional view of a typical tubeless passenger-car tire having the improved sealant of this invention located between the innermost carcass ply and an air-impervious liner.

The sealant layer 30 is preferably built into the tire as the innermost layer as shown in FIG. 1. The sealant can also be located between the carcass ply 10 and the liner 25 as is shown in FIG. 2.

In the manufacture of the tires of this invention, few changes from previous practices and procedures are required. The tires can be of any desired type or construction, of which the foregoing is only one example.

The tires can be manufactured with ordinary equipment without alteration, and with only a slight increase in raw materials and labor costs.

The principal change from ordinary practice is to place a sheet of the sealant material directly on the building drum to form the innermost layer of at least the crown portion of the tire when the tire is constructed as shown in FIG. 1. The sealant layer is formed to the desired dimensions by calendering or extruding before being applied to the building drum. The sealant layer can also be laminated together with the air impervious liner and both layers can be applied to the building drums simultaneously. The remainder of the tire is built onto the drum as in a conventional radial tire. Once the tire is built, it is vulcanized in a press using standard tire curing procedures and conditions which are well known in the art.

In FIG. 2, which shows another embodiment of the invention, the order of applying the various layers to the building drum would be different. The air impervious liner 25 would first be applied to the building drum and then the sealant layer 30 would be centered on the linear 25. The remainder of the tire would be built as described above and vulcanized.

Once the completed tire is vulcanized, its sealing capabilities can be greatly enhanced by coating the inside of the tire with a thin coating of a polyolefin polymer.

FIG. 3 shows a valuable embodiment of the invention. The sealant layer 30, which is innermost as in FIG. 1, is preferably coated, after the tire is vulcanized, with a polyolefin polymer 35 capable of flowing into punctures at tire-operating temperature. The said polyolefin polymer is capable of adhering to the sealant layer by means of surface tension alone.

Polyolefin polymers suitable for use in this invention are poly($\alpha$-monoolefin), homo- and co-polymers, i.e., polymers of monoolefin monomers containing 2 to about 14 carbon atoms, such as ethylene, propylene, isobutylene, 1-butene, 1-hexene, and the like, and mixtures of these monomers. The polyolefin polymers have a consistency at room temperature of a very thick grease but become less viscous when heated.

One preferred polyolefin used as the coating in the invention is polypropylene. A typical polypropylene may be purchased from the Eastman Chemical Company and is marketed under the name of Epoline M-85. Another preferred polyolefin used as the coating in the invention is polyethylene. A typical polyethylene may be purchased from the Allied Chemical Company under the name of Polyethylene Ac 1702. After either of these preferred polyolefins is heated to a suitable application temperature, it may be applied to the sealant layer by hand or by spraying. The degree of heating required depends upon the type of polyolefin used and the method of application chosen.

For example, the polypropylene should be spray applied when its viscosity is in the range of 1,000 to 50 centipoises, which is attained by heating the polypropylene to temperatures from 240° F. to 400° F. A viscosity of about 1,000 centipoises which is reached at 240° F. is preferred. If a hand application with a spatula or other suitable spreading tool is chosen, the polypropylene should be in the range of 20,000 to 1,000 centipoises, thereby requiring temperatures of from 190° F. to 240° F. A 20,000 centipoises viscosity at about 190° F. is preferred.

When a polyethylene is used as the coating, a viscosity in the range of 4,000 to 150 centipoises is desirable for spray application, thereby requiring a temperature of from 160° F. to 180° F. A viscosity of about 4,000 centipoises attained at about 160° F. is preferred. If a hand application is chosen, the polyethylene should be in the range of 20,000 to 4,000 centipoises, which are attained at temperatures of from 120° F. to 160° F. The 20,000 centipoises viscosity at about 120° F. is preferred.

It will be noted that in order to obtain the aforementioned viscosities at the stated temperatures, a predetermined molecular weight is required. For example, the polyethylene should have a molecular weight in the range of 500 to 3,000, preferably about 1,200. If other molecular weight polyolefins are used, then different temperatures will be required to attain the desired viscosities.

Regardless of the method of application chosen, each of the aforementioned polyolefins will cool down and become nearly solid at normal room temperatures. When the polyethylene mentioned above reaches a normal tire operating temperature of about 160° F., it will have a viscosity of about 4,000 centipoises. At this temperature, the polyethylene will retain essentially a thick grease consistency and will, thereby resist flow within the tire but still be capable of flowing into a puncture. The polypropylene mentioned above will retain a more viscous consistency at a normal tire operating temperature of about 160° F. At this temperature, its resistance to flow is substantial while its flexing properties are still sufficient to resist cracking or breaking of surface tension between the coating and the sealant layer.

Other compounding ingredients can be added to the polyolefins such as coloring pigments, plasticizers, and the like. Normally, other ingredients should be avoided because of their effect on viscosity of the polyolefin.

The thickness of polyolefin coating used is from about 0.01 inch to about 0.04 inch. In an average size passenger tire, the amount used will be from about 100 grams to about 400 grams and preferably from about 200 to about 300 grams per tire. The polyolefin is applied across the entire surface of the sealant layer. When the sealant layer is located between the innermost carcass ply 10 and the liner 25, as is shown in FIG. 2, the polyolefin coating is applied to the liner, preferably only on that portion of the linear which is under the tread portion.

In order to further illustrate the present invention, the following examples are presented.

EXAMPLE I

An unshaped and unvulcanized tire was built around a drum having a diameter of about 15 inches by first centering on the drum a layer of sealant rubber 30 having the composition as shown in Table 1, and a thickness of about 0.175 inch and a width of about 8 inches.

TABLE I

| Ingredient | Parts by weight |
| --- | --- |
| Cis-polyisoprene[1] | 100.00 |
| Zinc oxide | 1.00 |
| Stearic acid | 3.00 |
| Triisopropanolamine | 0.20 |
| Tetraethylthiuram disulfide | 0.45 |
| Diorthotolylguanidine | 0.10 |
| Mercaptobenzothiazole | 0.10 |

TABLE I-continued

| Ingredient | Parts by weight |
| --- | --- |
| Sulfur | 2.00 |

[1]Ameripol SN 606

Over this initial layer of rubber, the remainder of the tire was built including the lay-up of the air retaining liner 25, the carcass plies 10 and 11, circumferential belt plies 15 and 17, tread 21, sidewall 20 and bead portions 13. The fabricated tire was then removed from the builing drum and was shaped and molded in a press for about 18 minutes at a temperature of 350° F. and an internal pressure of about 400 psig to form a tire size HR 78-15.

The tire was mounted on a normal rim and inflated to 28 psig. The tire was then punctured in the tread area with two spaced 20-penny (0.191 inch diameter) nails, which were left in the tire. No loss of air occurred at the end of ten minutes. The nails were then removed and the air pressure checked at the end of fifteen minutes, again there was no loss of air pressure. The tire was then placed on the right rear position of an automobile and driven thirty-five miles at 55 mph with no loss of air pressure.

EXAMPLE II

Two tires containing the cis-polyisoprene sealant layer were built and molded as in Example I. One of these tires was coated with 250 grams of polyethylene 35 while the other tire was uncoated. A control tire was also prepared according to the method of Example I, except that no cis-polyisoprene sealant layer was built into the tire. All three tires were inflated to 24 psig and punctured with one 20-penny (0.191 inch diameter) nail. The tires were tested at 60 mph. After 25 miles, the control tire had to be terminated from the test because it had leaked to an unacceptable pressure of below 10 psig. Both the experimental tires had no pressure loss. After 150 miles of testing, both of the experimental tires had no pressure loss. The test of the tire containing the polyethylene coating on the cis-polyisoprene sealant was continued for an additional 2,000 miles after the nail had been thrown with no pressure loss.

The above Examples demonstrate that the cis-polyisoprene sealant is effective in sealing tire punctures. The sealing action is enhanced by applying a thin layer of a polyolefin polymer onto the cis-polyisoprene sealant layer.

Pneumatic tires employing this invention are useful as tires on passenger cars, buses, trucks, farm equipment, aircraft, and the like.

I claim:

1. A puncture-sealing tubeless pneumatic tire comprising two spaced inextensible beads, a ground contacting tread portion, a pair of individual sidewalls extending radially inward from the axial outer edges of said tread portion to join the respective beads, a carcass portion, and an integral layer of vulcanized sealant rubber disposed inwardly of said carcass portion, said sealing layer comprising at least one polymer selected from the group consisting of cis-polyisoprene and natural rubber, wherein said sealant layer has a vulcanized Shore A durometer of from about 25 to about 40 and a thickness in the range of from about 1 to about 50 percent of the total tire thickness, and wherein said sealant layer is substantially free of antioxidants.

2. A puncture-sealing pneumatic tire of claim 1 wherein the tire has a liner resistant to diffusion of air with the sealant layer bonded to the liner.

3. A puncture-sealing pneumatic tire of claim 1 wherein said sealing layer is disposed inwardly of said tread and carcass and extends from bead-to-bead.

4. A puncture-sealing pneumatic tire of claim 1 wherein said sealing layer is locally disposed inwardly of said tread portion.

5. A puncture-sealing pneumatic tire of claim 2 wherein said sealant layer is disposed inwardly of said liner.

6. A puncture-sealing pneumatic tire of claim 1 wherein the thickness of said sealant layer is from about 10 to about 30 percent of the total tire thickness.

7. A puncture-sealing pneumatic tire of claim 6 wherein the thickness of said sealant layer is from about 0.1 to about 0.2 inch.

8. A puncture-sealing pneumatic tire of claim 1 wherein the innermost surface of the tire is coated with a thin layer of material consisting of a polyolefin capable of attaining a viscosity of at least 20,000 centipoises at a given temperature between 120° F. and 400° F. and wherein said polyolefin material adheres to the inner periphery of the tire essentially solely by surface tension.

9. A puncture-sealing pneumatic tire of claim 8 wherein the polyolefin material comprises a poly(α-monoolefin).

10. A puncture-sealing pneumatic tire of claim 9 wherein the polyolefin material comprises polyethylene.

11. A puncture-sealing pneumatic tire of claim 9 wherein the polyolefin material comprises polypropylene.

12. A puncture-sealing pneumatic tire of claim 8 wherein the polyolefin material has a thickness of from about 0.01 to about 0.04 inch.

13. A puncture-sealing pneumatic tire of claim 12 wherein the amount of polyolefin material used is from about 100 to about 400 grams.

14. A puncture-sealing pneumatic tire of claim 8 wherein the polyolefin material has a viscosity of about 4,000 centipoises or more at temperatures of about 160° F. or less.

15. A puncture-sealing pneumatic tire of claim 8 wherein the polyolefin material has a viscosity of 20,000 centipoises or less at temperatures of about 190° F. or greater.

16. A method of making a puncture-sealing tubeless pneumatic tire comprising:
   (a) building an adherent unvulcanized sealant layer onto an inner portion of an unvulcanized tire construction having bead, tread, and carcass portions, wherein said sealant layer comprises at least one polymer selected from the group consisting of cis-polyisoprene and natural rubber and has a vulcanized Shore A durometer of from about 25 to about 40 and a thickness of from about 1 to about 50 percent of the total tire thickness, and wherein said sealant layer is substantially free of antioxidants;
   (b) shaping said unvulcanized tire construction;
   (c) molding said tire construction; and
   (d) heating said tire construction under pressure to simultaneously covulcanize said construction and adherent sealant layer to form said pneumatic tire containing an integral sealant layer.

17. A method of claim 16 wherein said sealant layer is first laminated to an air impervious liner and then said liner and said sealant are applied as one component.

18. A method of claim 16 with the added step of applying onto the innermost surface of the tire a thin layer of material consisting of a polyolefin capable of attaining a viscosity of at least 20,000 centipoises at a given temperature between 120° F., and 400° F. and wherein said polyolefin material adheres to the inner periphery of the tire essentially solely by surface tension.

19. A method of claim 18 wherein the polyolefin material is applied by spraying.

20. A method of claim 16 wherein said sealant layer is the innermost portion of the tire.

21. A method of claim 20 wherein the thickness of said sealant layer is from about 0.1 to about 0.2 inch.

22. A method of claim 18 wherein the polyolefin material comprises a poly(α-monoolefin).

23. A method of claim 22 wherein the polyolefin material comprises polyethylene.

24. A method of claim 22 wherein the polyolefin material comprises polypropylene.

25. A method of claim 18 wherein the polyolefin material has a thickness of from about 0.01 to about 0.04 inch.

26. A method of claim 25 wherein the amount of polyolefin material used is from about 100 to about 400 grams.

* * * * *